March 26, 1957   C. G. DE LAVAL, JR   2,786,748
METHOD OF MELTING IRON AND STEEL
Filed Dec. 26, 1952
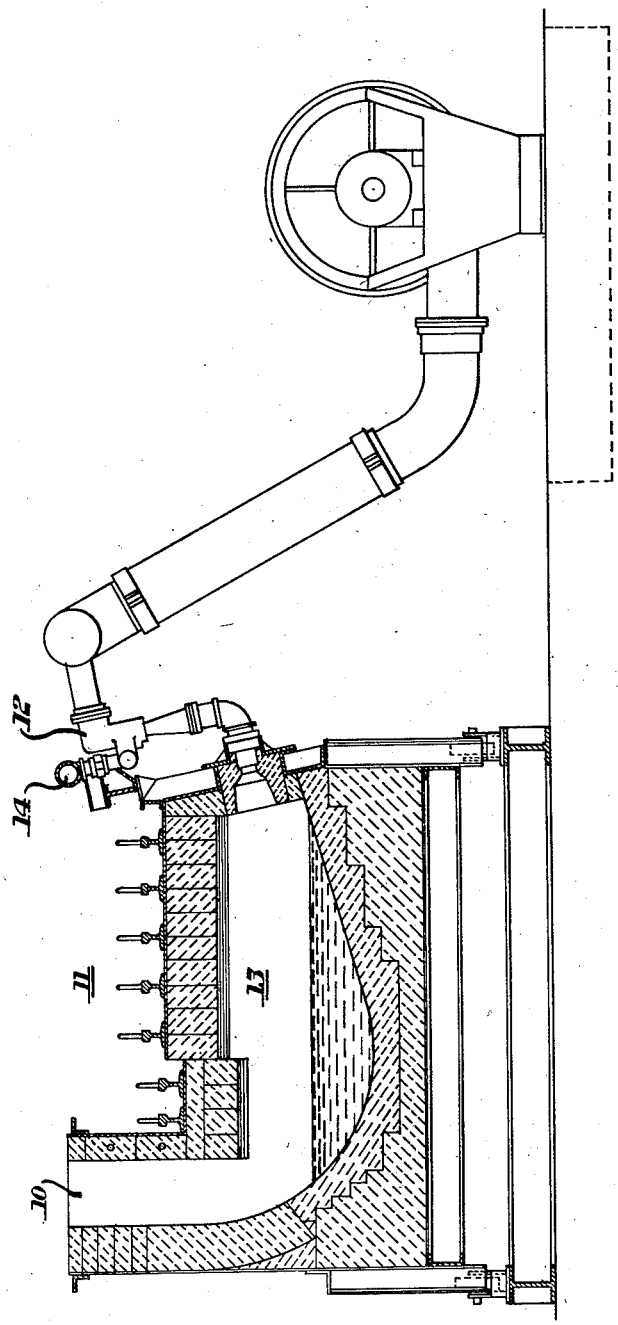
INVENTOR
Carl George DeLaval, Jr.

United States Patent Office 2,786,748
Patented Mar. 26, 1957

2,786,748

METHOD OF MELTING IRON AND STEEL

Carl George de Laval, Jr., Mount Lebanon Township, Allegheny County, Pa.

Application December 26, 1952, Serial No. 328,051

6 Claims. (Cl. 75—43)

This invention relates to the melting of iron and steel and particularly to melting iron and steel in a direct fired reverberatory furnace. In the melting of iron and steel in direct fired reverberatory furnaces it has heretofore been the practice to melt the iron-containing materials to form a molten pool in the bottom of the furnace and thereafter, if desired, reduce the carbon content of the material to a desired level by the addition of oxidizing agents such as iron ore or mill scale. This requires that the metal be retained in the furnace for a more or less extended period of time while the oxidation takes place. At the same time the addition of such materials tends to cool the molten bath requiring additional heat to maintain the fluidity.

I have discovered a method of melting iron and steel which is particularly applicable to direct fired reverberatory furnaces. The practice of my invention permits the melt-down period to be materially reduced, thus providing greater economies in furnace time and fuel expenditure than has heretofore been possible. At the same time I have found that the practice can be used so as to avoid the need for the addition of iron ore or mill scale to reduce the carbon content of the melt when the practice is used for the production of steel castings and the like.

The practice of my invention can perhaps be best understood by reference to an example and to the accompanying drawing. A charge weighing approximately 3600 pounds and made up essentially of iron and steel scrap was charged into the stack 10 of a direct fired reverberatory furnace 11. The temperature of the scrap was raised to the melting point and then the fuel valve 12 in the fuel line 14 was alternately opened and closed so that the interior 13 of the furnace was alternately exposed to a burning mixture of fuel and oxygen-containing air and to an oxygen-containing gas substantially free of fuel.

A similar charge was placed in a like furnace and heated in the usual manner. The charge melted down according to my process in approximately 60 minutes whereas the charge melted according to the usual process took approximately 90 minutes or 50% longer. In addition, when my process was used in the production of steel castings the carbon had been reduced by the iron oxide formed during the melt down and no additional iron ore was necessary in the bath for further refinement whereas in the case of steel melting according to the usual practice, substantial amounts of iron ore were needed.

I have found that a similar effect can be obtained by setting the valve 12 in the fuel line 14 to a position where the fuel feed is insufficient to use up the oxygen in the air feed so that a continuous oxidizing flame is directed against the charge and then periodically alternating the fuel valve 12 to the full on and full off positions.

While the practice of my invention goes directly contrary to the practices heretofore followed in the art where every effort was made to avoid oxidizing the charged metal, I have found my practice to be remarkably effective in direct fired reverberatory furnaces in reducing the time of melt down as well as the amount of fuel consumed for the melt down.

I have also found that the rapidity and efficiency of melt down which characterize my process can be achieved without loss of iron as iron oxide to the slag by adding carbon or silicon in the charge in amount sufficient to promptly reduce the iron oxide as it burns at the point of melting.

While I have shown and described a preferred practice of my invention it will be understood that it may be otherwise embodied within the scope of the following claims.

I claim:

1. The process of treating iron and steel in a direct fired reverberatory furnace which comprises melting down a charge therein by alternately introducing into the furnace first a burning mixture of fuel and a gas containing uncombined oxygen and second a gas containing uncombined oxygen substantially free of fuel and repeating the cycle until the charge is melted whereby the charge is rapidly raised to the melting temperature and a portion of the iron in the charge is periodically oxidized.

2. The process of treating iron and steel in a direct fired reverberatory furnace which comprises melting down a charge therein by alternately impinging against the charge first a burning mixture of fuel and a gas containing uncombined oxygen and second a gas containing uncombined oxygen substantially free of fuel and repeating the cycle until the charge is melted whereby the charge is rapidly raised to the melting temperature and a portion of the iron in the charge is periodically oxidized.

3. The process of treating iron and steel in a direct fired reverberatory furnace which comprises melting down a charge therein by alternately introducing into the furnace first a burning mixture of fuel and a gas containing uncombined oxygen and second a gas containing uncombined oxygen substantially free of fuel and repeating the cycle until the charge is melted whereby the charge is rapidly raised to the melting temperature and a portion of the iron in the charge is periodically oxidized, and supplying at the point of oxidation sufficient material of the group carbon and silicon to convert substantially all the remaining oxidized iron to molten metallic iron.

4. The process of treating iron and steel in a direct fired reverberatory furnace which comprises the steps of charging the stack of said furnace with metallic material containing iron, alternately shutting off the fuel feed to the furnace while maintaining a substantially constant supply of gas containing uncombined oxygen to the furnace and repeating the cycle until the charge is melted whereby the material in the stack is rapidly raised to melting temperature and portions of the iron contained therein are periodically oxidized.

The process of treating iron ad steel in a direct fired reverberatory furnace which comprises the steps of charging the stack of said furnace with metallic material containing iron, alternately shutting off the fuel feed to the furnace while maintaining a substantially constant supply of gas containing uncombined oxygen to the furnace and repeating the cycle until the charge is melted whereby the material in the stack is rapidly raised to melting temperature and portions of the iron contained therein are periodically oxidized, and supplying at the point of oxidation sufficient material of the group carbon and silicon to convert substantially all of the remaining oxidized iron to molten metallic iron.

6. The process of treating iron and steel in a direct fired reverberatory furnace which comprises melting down a charge therein by introducing into the furnace first a burning mixture of fuel and gas containing uncombined oxygen in which the oxygen is in excess of the stoichiometric amount needed to consume the fuel, second periodically increasing and decreasing the fuel feed so as to alternately reduce and increase the amount of unconsumed oxygen in the mixture and repeating the cycle until the charge is melted whereby the charge is rapidly raised to the melting temperature and a portion of the iron in the charge is periodically oxidized.

References Cited in the file of this patent

UNITED STATES PATENTS

| | | |
|---|---|---|
| 95,843 | Siemens | Oct. 12, 1869 |
| 708,783 | Schwartz | Sept. 9, 1902 |
| 1,140,550 | Weissenburger | May 25, 1915 |
| 1,419,801 | Bassett | June 13, 1922 |
| 1,948,695 | Brassert | Feb. 27, 1934 |
| 2,002,010 | Hilliard | May 21, 1935 |
| 2,362,085 | Morgan | Nov. 7, 1944 |
| 2,446,511 | Kerry | Aug. 3, 1948 |
| 2,470,728 | Sklenar | May 17, 1949 |

FOREIGN PATENTS

| | | |
|---|---|---|
| 126,369 | Great Britain | May 15, 1919 |